United States Patent
Hawkins et al.

(10) Patent No.: US 6,529,815 B2
(45) Date of Patent: Mar. 4, 2003

(54) METHOD AND SYSTEM FOR ENHANCED ENGINE CONTROL

(75) Inventors: Jeffery S. Hawkins, Farmington Hills, MI (US); Ian D. McKenzie, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/730,964

(22) Filed: Dec. 5, 2000

(65) Prior Publication Data

US 2002/0069011 A1 Jun. 6, 2002

(51) Int. Cl.$^7$ .............................................. F02D 41/22
(52) U.S. Cl. .................... 701/104; 701/105; 701/107; 701/108; 701/112; 123/305; 123/350; 123/568.21; 123/563; 123/198 D
(58) Field of Search ................................. 701/104, 105, 701/107, 108, 112; 123/305, 350, 568.21, 568.22, 198 D, 540, 542, 563; 60/611

(56) References Cited

U.S. PATENT DOCUMENTS

| 4,055,158 A | | 10/1977 | Marsee |
| 4,263,883 A | | 4/1981 | Treible et al. |
| 4,329,954 A | | 5/1982 | Dobbs |
| 4,389,994 A | * | 6/1983 | Denz et al. ............ 123/406.55 |
| 4,397,285 A | | 8/1983 | O'Neill |
| 4,485,625 A | * | 12/1984 | Fujimoto et al. ........... 123/494 |
| 4,545,357 A | * | 10/1985 | Kearsley et al. ........... 123/556 |
| 4,563,983 A | * | 1/1986 | Hayashi et al. ........... 123/41.21 |
| 4,606,312 A | | 8/1986 | Nakano et al. |
| 4,763,630 A | | 8/1988 | Nagase et al. |
| 5,024,191 A | | 6/1991 | Nagahiro et al. |
| 5,070,832 A | * | 12/1991 | Hapka et al. ........... 123/198 D |
| 5,353,757 A | * | 10/1994 | Susa et al. ................... 123/563 |
| 5,607,010 A | | 3/1997 | Schonfeld et al. |
| 5,698,776 A | | 12/1997 | Tomisawa |

FOREIGN PATENT DOCUMENTS

| GB | 2 093 119 A | | 8/1982 | |
| JP | 1-177418 | * | 7/1989 | ................ 60/605.1 |

OTHER PUBLICATIONS

U.S. patent application Ser. No. 09/730,281, filed Dec. 5, 2000, Inventor(s): Curtis P. Ritter et al.
U.S. patent application Ser. No. 09/730,909, filed Dec. 5, 2000, Inventor(s): Eric D. Thomas.
U.S. patent application Ser. No. 09/730,943, filed Dec. 5, 2000, Inventor(s): Steven M. Weisman.
DDEC IV Application and Installation, 7SA742 9907 Copyright© 1999 Detroit Diesel Corporation, pp. 4–71, 4–73, 4–75, and 4–77.

* cited by examiner

*Primary Examiner*—Andrew M. Dolinar
(74) *Attorney, Agent, or Firm*—Brooks & Kushman, P.C.

(57) ABSTRACT

A method for controlling an engine of a system having an air-charger system connected to the engine includes sensing air-charger system temperature; comparing the air-charger system temperature to a temperature threshold; and adjusting an engine control parameter when the air-charger system temperature exceeds the temperature threshold. A system for controlling engine operation is also provided.

59 Claims, 4 Drawing Sheets

— 1 —

METHOD AND SYSTEM FOR ENHANCED ENGINE CONTROL

TECHNICAL FIELD

The invention relates to method and system for controlling operation of an engine based on air charger system temperature.

BACKGROUND ART

Some internal combustion engines are designed to be used in hazardous or potentially hazardous environments, such as underground mining applications and offshore drilling applications. Typically, such engines are mechanically controlled. More specifically, fuel injections are controlled based on movement of a cam shaft. Furthermore, fuel injection timing for such engines is a function of engine load, and not engine speed. As a result, these engines are inefficient.

For non-hazardous environments, engines are typically controlled by an electronic control unit having volatile and non-volatile memory, input and output driver circuitry, and a processor capable of executing a stored instruction set. A particular electronic control unit communicates with numerous sensors, actuators, and other control units to control various functions of the engine and its associated systems. Such an electronic control unit, however, is not configured to be used in hazardous or potentially hazardous environments, and does not include a means for effectively controlling engine temperatures and associated component temperatures.

DISCLOSURE OF INVENTION

The invention addresses the shortcomings of the prior art by providing an improved method and system for controlling engine operation, wherein the method and system are especially useful in hazardous or potentially hazardous environments. The method and system of the invention provide significantly improved engine efficiency compared with prior art systems and methods that include mechanically controlled engines.

Under the invention, a method is provided for controlling an engine of a system having an air-charger system connected to the engine. The method includes sensing air-charger system temperature; comparing the air-charger system temperature to a temperature threshold; and adjusting an engine control parameter when the air-charger system temperature exceeds the temperature threshold.

Advantageously, operating temperatures of the system may be effectively controlled by the method of the invention so as to allow the system to operate in hazardous and potentially hazardous environments. Furthermore, the method allows the engine to continue operation when the temperature threshold is exceeded. Thus, an operator is provided time to respond to a situation, rather than having the engine abruptly shut down.

Sensing air-charger system temperature may include sensing air-charger compressor outlet temperature. Alternatively or supplementally, sensing air-charger system temperature may include sensing temperature of air-charger system piping.

Adjusting an engine control parameter preferably includes reducing available engine torque. As a result, fuel supplied to the engine is reduced, but the engine may continue to operate. Other examples of adjusting an engine control parameter include adjusting timing of a fuel injection to the engine, adjusting air supplied to the engine, adjusting exhaust gas re-circulation rate, and reducing engine loading.

The method may also include comparing the air-charger system temperature to an additional temperature threshold, and shutting down the engine when the air-charger system temperature exceeds the additional temperature threshold.

Further under the invention, a system for controlling engine operation includes an air charger system sensor for sensing air charger system temperature. The system also includes a controller in communication with the air charger system sensor. The controller includes control logic for comparing the air-charger system temperature to a temperature threshold, and control logic for adjusting an engine control parameter when the air-charger system temperature exceeds the temperature threshold.

A computer readable storage medium according to the invention is also provided. The computer readable storage medium has information stored thereon representing instructions executable by an engine controller that is in communication with an air charger system sensor. The computer readable storage medium includes instructions for determining air charger system temperature based on signals provided by the air charger system sensor; instructions for comparing the air charger system temperature to a temperature threshold; and instructions for adjusting an engine control parameter when the air-charger system temperature exceeds the temperature threshold.

These and other objects, features, and advantages of the present invention are readily apparent from the following detailed description of the best modes for carrying out the invention when taken in connection with the accompanying drawings.

BEST MODES FOR CARRYING OUT THE INVENTION

Figure 1:
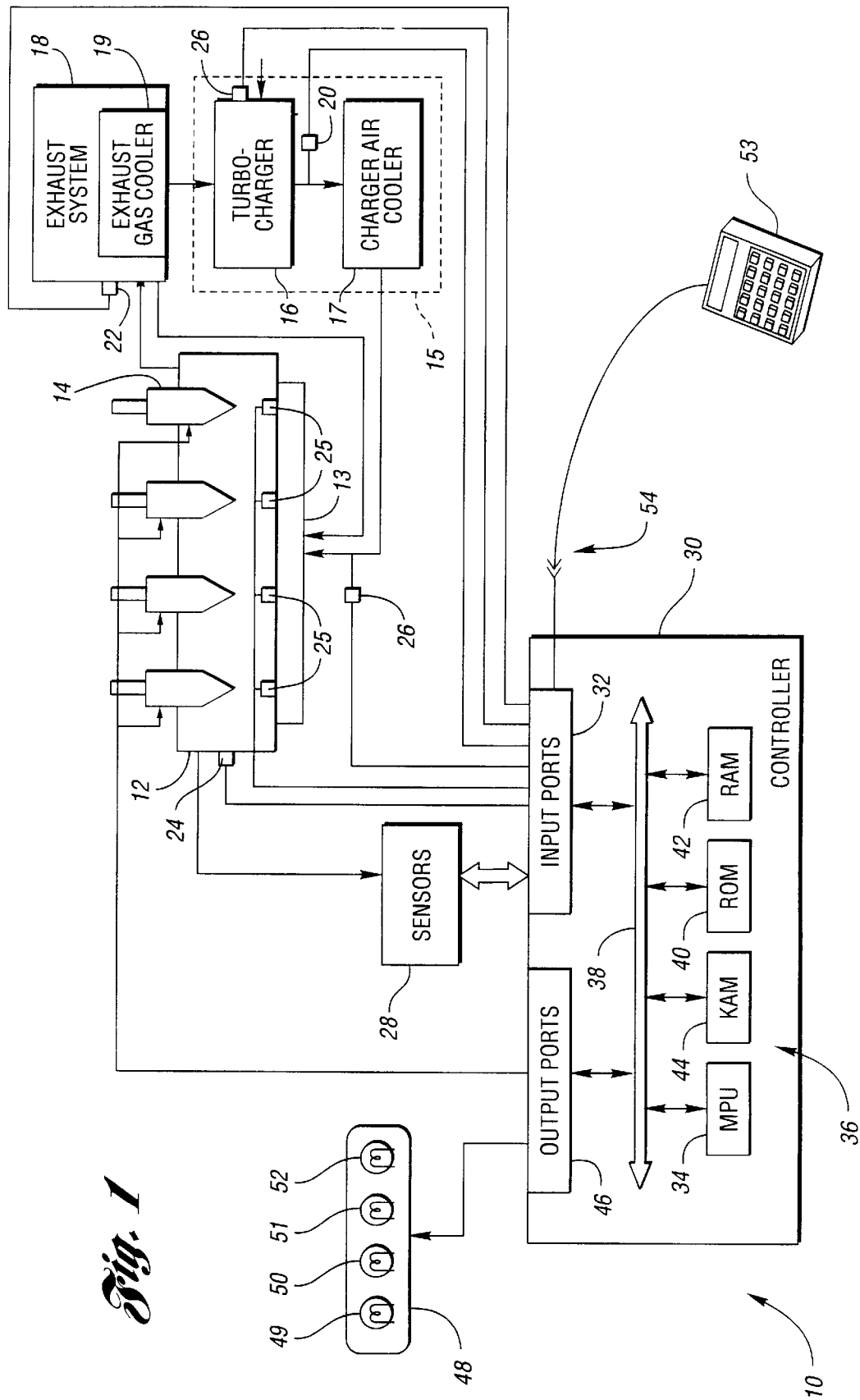
FIG. 1 is a schematic diagram of one embodiment of a system for controlling operation of an engine according to the invention.

FIG. 1 shows a system for controlling engine operation. While the system may be used in any suitable environment, the system is particularly useful in a hazardous or potentially hazardous environment, as explained below in greater detail. Hazardous or potentially hazardous environments include environments in which combustible materials are present in either a confined or unconfined state. Such environments may include, for example, underground mining operations, construction operations and offshore drilling operations. The system may be used with a vehicle or any other engine-operated equipment such as mining equipment, construction equipment and/or drilling/pumping equipment. Examples of such equipment include mud pumps and fracturing units.

The system, generally indicated by reference numeral 10, includes an engine 12 having an air inlet manifold 13 and a plurality of cylinders, each of which is fed by one or more fuel injectors 14. In a preferred embodiment, engine 12 is a multi-cylinder compression ignition internal combustion engine, such as a four, six, eight, twelve, sixteen or twenty-four cylinder diesel engine, for example. An air-charger system 15 supplies compressed air to the air inlet manifold 13. The air-charger system 15, which may be referred to as a subsystem of the system 10, includes a turbo-charger 16, or any other suitable air-charger, and a charged-air cooler 17 connected to the turbo-charger 16. The charged-air cooler 17 may be any suitable device configured to cool air exiting a compressor (not shown) of the turbo-charger 16, prior to the air being introduced to the air inlet manifold 13. For example, the charged-air cooler 17 may be configured to use air, water, engine coolant and/or any other suitable type of fluid to cool the air exiting the compressor of the turbo-charger 16.

An exhaust system 18, which may also be referred to as a subsystem of the system 10, is connected to the engine 12 for removing exhaust gases from the engine 12. The exhaust system 18 preferably includes an exhaust gas cooler 19. The exhaust gas cooler 19 may be any suitable device configured to reduce temperature of the exhaust gases. For example, the exhaust gas cooler 19 may be configured to use air, water, engine coolant and/or any other suitable type of fluid to cool the exhaust gases. The exhaust system 18 is also connected to the air-charger system 15 for driving the compressor of the turbo-charger 16. Furthermore, the exhaust system 18 may be connected to the air inlet manifold 13 so that a portion of the exhaust gases may be returned or re-circulated to the engine 12. Such an arrangement is referred to as exhaust gas re-circulation, and the amount of exhaust gas returned to the engine 12 is referred to as exhaust gas re-circulation rate.

The system 10 further includes a plurality of sensors for generating signals indicative of corresponding operating conditions or parameters. Such sensors include an air-charger system temperature sensor 20 for sensing temperature of the air-charger system 15, and an exhaust system temperature sensor 22 for sensing temperature of the exhaust system 18. Preferably, the air-charger system temperature sensor 20 is used to measure compressor outlet temperature of the turbo-charger 16, and is mounted proximate the turbo-charger compressor (not shown), or proximate the charged-air cooler 17 upstream of the charged-air cooler 17. Thus, the air-charger system temperature sensor 20 may be used to measure air temperatures upstream of the air inlet manifold 13. Alternatively, the air-charger system temperature sensor 20 may be used to measure temperature of one or more components of the air-charger system 15. For example, the air-charger system temperature sensor 20 may be mounted on an external surface of air-charger system piping upstream of the charged-air cooler 17.

The exhaust system temperature sensor 22 preferably measures exhaust gas temperature downstream of the exhaust gas cooler 19, and is mounted within exhaust system piping. Alternatively, the exhaust system temperature sensor 22 may be used to measure temperature of one or more components of the exhaust system 18. For example, the exhaust system temperature sensor 22 may be mounted on an external surface of the exhaust system piping.

Additional sensors include a crankshaft sensor 24 and a plurality of pressure sensors 25. The crankshaft sensor 24 senses position of the crankshaft (not shown), such as by sensing position of an encoder wheel (not shown) of the crankshaft. This information can be used to determine rotational speed of the crankshaft so as to determine engine speed. Furthermore, this information can be used to determine position of the pistons (not shown) within the cylinders.

The pressure sensors 25 are used to sense cylinder pressure of the engine 12. Preferably, at least one pressure sensor 25 is disposed in or proximate each cylinder for measuring cylinder pressure of each cylinder. Alternatively, the system 10 may include one or more pressure sensors 25 for sensing cylinder pressure in one or more cylinders.

Furthermore, the system preferably includes one or more ignitable gas/particle sensors 26 for sensing ignitable gas and/or particles. One gas/particle sensor 26 is preferably mounted proximate the air inlet manifold 13, and another gas/particle sensor 26 is preferably mounted proximate an air inlet of the turbo-charger 16.

The system 10 may also include various other sensors 28 for generating signals indicative of corresponding operating conditions or parameters of the engine 12, a transmission (not shown), and/or other system components. For example, the sensors 28 may generate signals corresponding to such parameters as throttle position, battery voltage, fuel temperature, ambient air temperature, and ambient air pressure.

The sensors 20–28 are in electrical communication with a controller 30 via input ports 32. The controller 30 may be disposed remotely from the engine 12 or mounted to the engine 12. Furthermore, the controller 30 is preferably disposed in an enclosure that inhibits dust, gases, liquids and other substances from contacting the controller 30. While the enclosure may comprise any suitable material, the enclosure comprises stainless steel.

The controller 30 preferably includes a microprocessor 34 in communication with various computer readable storage media 36 via data and control bus 38. The computer readable storage media 36 may include any of a number of known devices which function as a read-only memory (ROM) 40, random access memory (RAM) 42, keep-alive memory (KAM) 44, and the like. The computer readable storage media 30 may be implemented by any of a number of known physical devices capable of storing data representing instructions executable via a computer such as controller 30. Known devices may include, but are not limited to, PROM, EPROM, EEPROM, flash memory, and the like in addition to magnetic, optical, and combination media capable of temporary or permanent data storage.

The computer readable storage media 36 include data representing program instructions (software), calibrations, operating variables, threshold values, and the like that are used in conjunction with associated hardware to effect control of various systems and subsystems of the vehicle, such as the engine 12, a transmission (not shown), and the like. Controller 30 receives signals from sensors 20–28 via input ports 32, and generates output signals that may be provided to various actuators and/or components, such as electronic control valves of the fuel injectors 14, via output ports 46. Signals may also be provided to a display device 48, which may include various indicators to communicate information relative to system operation to the operator of the system 10. The indicators may include, for example, a high temperature light 49, a high pressure light 50, a check engine light 51, and a stop engine light 52. Of course, alphanumeric, audio, video, and/or other displays or indicators may be utilized if desired.

A data, diagnostics, and programming interface 53 may also be selectively connected to controller 30 via a plug 54 to exchange various information therebetween. Interface 53 may be used to change values within the computer readable storage media 36, such as configuration settings, calibration variables, control logic, temperature thresholds, engine speed thresholds, and vapor concentration thresholds.

In operation, controller 30 receives signals from sensors 20–28 and executes or implements control logic embedded in associated hardware and/or software to control engine operation in hazardous and potentially hazardous environments. The control logic is preferably implemented by a programmed microprocessor, such as microprocessor 34, as described below in further detail. However, various alternative hardware and/or software may be used to implement the control logic without departing from the spirit or scope of the invention. A preferred embodiment of controller 30 includes a DDEC controller available from Detroit Diesel Corporation, Detroit, Mich. Various other features of this controller are described in detail in U.S. Pat. Nos. 5,477,827 and 5,445,128, the disclosures of which are hereby incorporated by reference in their entirety.

Figure 2:
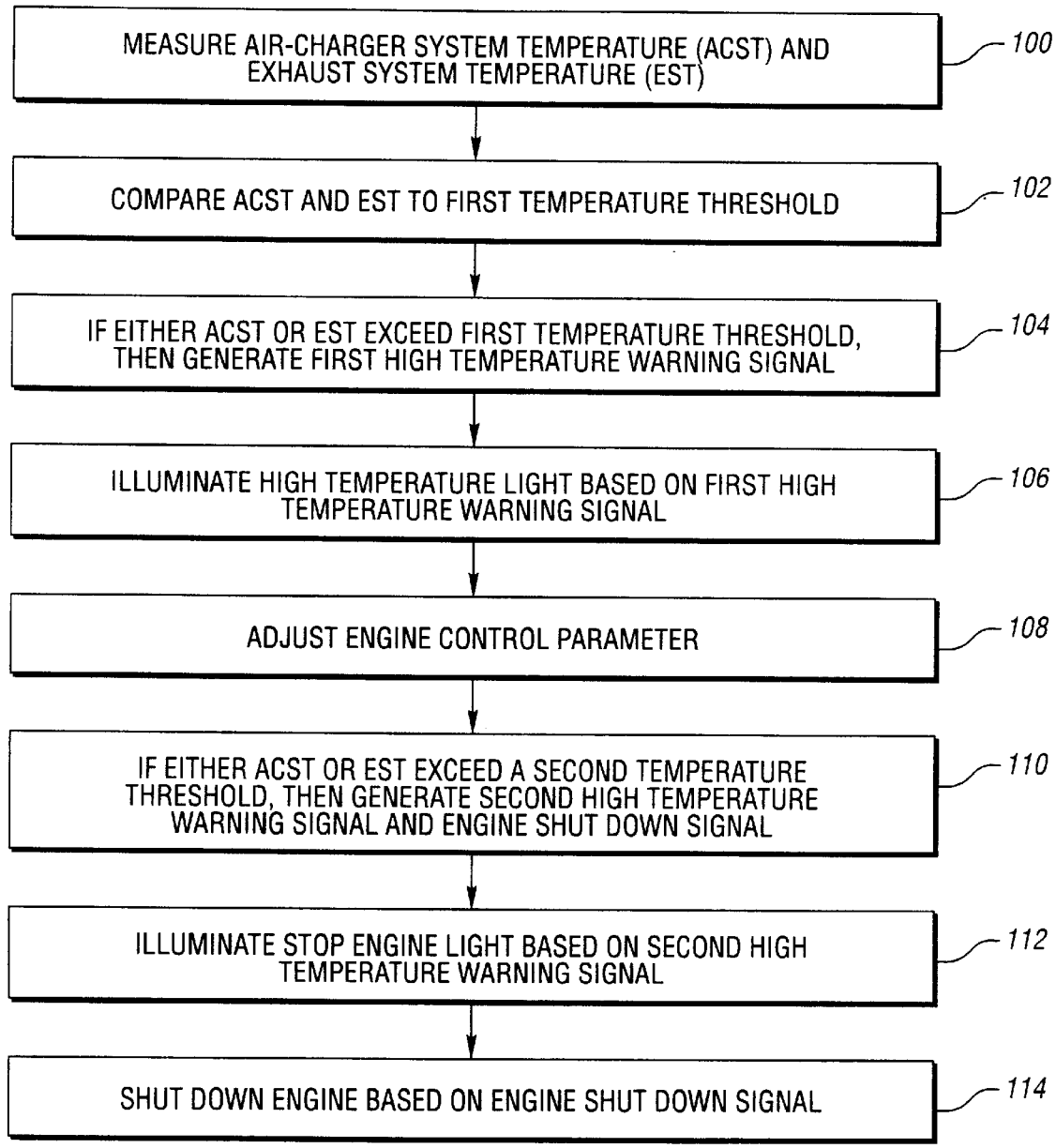
FIG. 2 is a flow chart illustrating operation of a method for controlling the engine according to the invention.

FIG. 2 is a flow chart illustrating operation of a method or system, such as system 10, for controlling engine operation according to the present invention. As will be appreciated by one of ordinary skill in the art, this flow chart and other flow charts in this application represent control logic or functions that may be effected or implemented by hardware, software, or a combination of hardware and software. The various functions are preferably implemented by the controller 30. Alternatively, one or more of the functions may be implemented by dedicated electric, electronic, or integrated circuits. As will also be appreciated, the control logic may be implemented using any one of a number of known programming and processing techniques or strategies and is not limited to the order or sequence illustrated here for convenience only. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

At step 100, the sensors 20 and 22 are used to measure or otherwise determine air-charger system temperature (ACST) and exhaust system temperature (EST), respectively. Next, at step 102, the ACST and the EST are compared to a first temperature threshold by the controller 30. The first temperature threshold is preferably below a maximum operating temperature allowed in hazardous or potentially hazardous environments, which is typically 200° C. For example, the first temperature threshold may be in the range of 160 to 190° C. Alternatively, the ACST and the EST may each be compared to a different first temperature threshold.

If either the ACST or the EST exceeds the first temperature threshold, then the controller 30 preferably generates a first high temperature warning signal at step 104. The first high temperature warning signal may be used to illuminate or otherwise activate the high temperature light 49, or other suitable indicator, as indicated at step 106. The first high temperature warning signal or other signal generated by the controller 30 may also be recorded as a code in non-volatile memory to assist maintenance personnel in diagnosing engine operating conditions. For example, the code may indicate the date, time and pertinent engine operating parameters at the time the ACST or EST exceeded the first temperature threshold.

If either the ACST or the EST exceeds the first temperature threshold, then the controller 30, or other suitable device, also adjusts one or more engine operating or control parameters, as indicated at step 108, in an effort to reduce the ACST and/or the EST. Control parameters that may be adjusted include, but are not limited to, fuel quantity provided by the fuel injectors 14, timing of fuel injections, air supplied to the engine 12, exhaust gas re-circulation rate, and engine loading from accessories such as an alternator (not shown) and/or air compressor (not shown).

Because the amount of fuel provided by the fuel injectors 14 is preferably dependant on desired engine torque and/or engine speed, fuel quantities may be reduced by reducing engine torque and/or speed as a function of temperature and/or time. For example, a desired engine torque, as determined by a particular throttle position or by a variable speed governor, may be reduced by a predetermined amount based on the ACST or EST. As another example, a desired engine torque may be reduced by a predetermined amount based on the amount of time the ACST or EST has exceeded the first temperature threshold. Preferably, reduced engine torque values and/or reduced engine speed values may be found in two look-up tables, one that references ACST and/or time, and another that references EST and/or time. Additional details regarding controlling fuel injections based on desired engine torque and/or engine speed are disclosed in U.S. Pat. Nos. 6,125,823 and 5,647,317, which are assigned to the assignee of the present invention and are hereby incorporated by reference in their entirety.

With respect to timing of fuel injections, such timing may be advanced, for example, so that injections commence sooner with respect to piston stroke. More specifically, timing may be adjusted so that a particular fuel injection begins when a corresponding piston is at a lower point on the up-stroke of the piston. Because the fuel introduced by the particular fuel injection will experience increased expansion, temperatures of exhaust gases from the engine 12 can be reduced. With this approach, then, it is possible to reduce the ACST and/or EST without reducing engine performance. Alternatively, timing of fuel injections may be adjusted in any suitable manner so as to reduce the ACST and/or EST.

Air supplied to the engine 12 may be adjusted by controlling the amount of air supplied by the air-charger system 15. For example, if the turbo-charger 16 of the air-charger system 15 is configured as a variable geometry or variable nozzle turbo-charger, the outlet orifice (not shown) of the turbo-charger compressor (not shown) may be adjusted so as to reduce the amount of compressed air provided to the air inlet manifold 13. With less compressed air being introduced into the engine 12, engine operating temperatures as well as the ACST and/or EST may also be reduced. Alternatively, air supplied to the engine 12 may be adjusted in any suitable manner so as to reduce the ACST and/or EST.

Exhaust gas re-circulation rate may be adjusted, for example, by decreasing the amount of exhaust gas that is returned to the air inlet manifold 13. As a result, the ACST and/or the EST may be reduced. Alternatively, exhaust gas re-circulation rate may be adjusted in any suitable manner so as to reduce the ACST and/or EST.

With respect to engine loading, accessories such as the alternator (not shown) and/or an air compressor (not shown) may be deactivated or slowed down so as to reduce engine loading. Because of the reduced engine loading, engine output can be reduced, which may cause a reduction in the ACST and/or EST.

While the step of adjusting one or more control parameters preferably commences at about the same time the high temperature light 49 or other indicator is illuminated or otherwise activated, the controller 30 or other suitable device may begin adjusting one or more control parameters prior to alerting an operator. For example, the step of adjusting one or more control parameters may begin when either the ACST or EST exceeds a temperature threshold that is lower than the first temperature threshold.

If either the ACST or the EST does not reduce or at least level off after one or more control parameters are adjusted, then the controller 30 preferably generates a second high temperature warning signal and an engine shut down signal if and when a second temperature threshold is exceeded by either the ACST or the EST, as indicated at step 110. The second temperature threshold is greater than the first temperature threshold, and is preferably at or below the maximum operating temperature allowed in hazardous or potentially hazardous environments. For example, the second temperature threshold may be in the range of 180 to 200° C. Alternatively, the second temperature threshold may be set at any appropriate level for a particular application. It is to be understood that the ACST and the EST may each be compared to the same second temperature threshold or to a different second temperature threshold.

At step 112, the second high temperature warning signal may be used to illuminate or otherwise activate the stop engine light 52, or other suitable indicator. At step 114, the engine shut down signal is used to shut down the engine 12. For example, the engine shut down signal may be used to inhibit or shut off fuel provided by the fuel injectors 14. As another example, the engine shut down signal may be used to activate a valve in the air inlet manifold 13 so as to inhibit air flow to the engine 12. As another example, the engine shut down signal may be used to activate a fluid injection device for injecting an inert fluid such as halon into the air inlet manifold 13. As yet another example, the engine shutdown signal may be used to open exhaust valves in the cylinders so that air cannot be compressed in the cylinders.

Advantageously, operating temperatures of the system 10 may be effectively controlled so as to allow the system 10 to operate in hazardous and potentially hazardous environments. More specifically, the system 10 and method of the invention may be operated to effectively control the ACST and EST. Furthermore, engine performance may be enhanced due to cooler air temperatures at the air inlet manifold 13. Alternatively, the system 10 and method of the invention may be operated to control either the ACST or the EST.

Because the ACST can be effectively controlled so that the ACST will not exceed maximum operating temperatures allowed in a hazardous environment, e.g., 200° C., the air-charger system 15 may be manufactured with standard parts, rather than explosion proof parts. Moreover, the charged-air cooler 17 may be configured as an air cooled device, rather than a more elaborate and expensive device that uses water or engine coolant as the cooling fluid. Because temperatures within the exhaust system 18 may exceed 200° C., however, the exhaust system 18 may need to be explosion proof.

Furthermore, the system 10 and method of the invention allow the engine 12 to continue operation if only the first temperature threshold is exceeded. Thus, the operator is provided time to respond to a situation, rather than having the engine 12 abruptly shut down. Moreover, the system 10 and method of the invention provide additional protection against mechanical failures, such as cracked or broken fuel injector spray tips, that may cause higher turbo-charger outlet temperatures.

Figure 3:
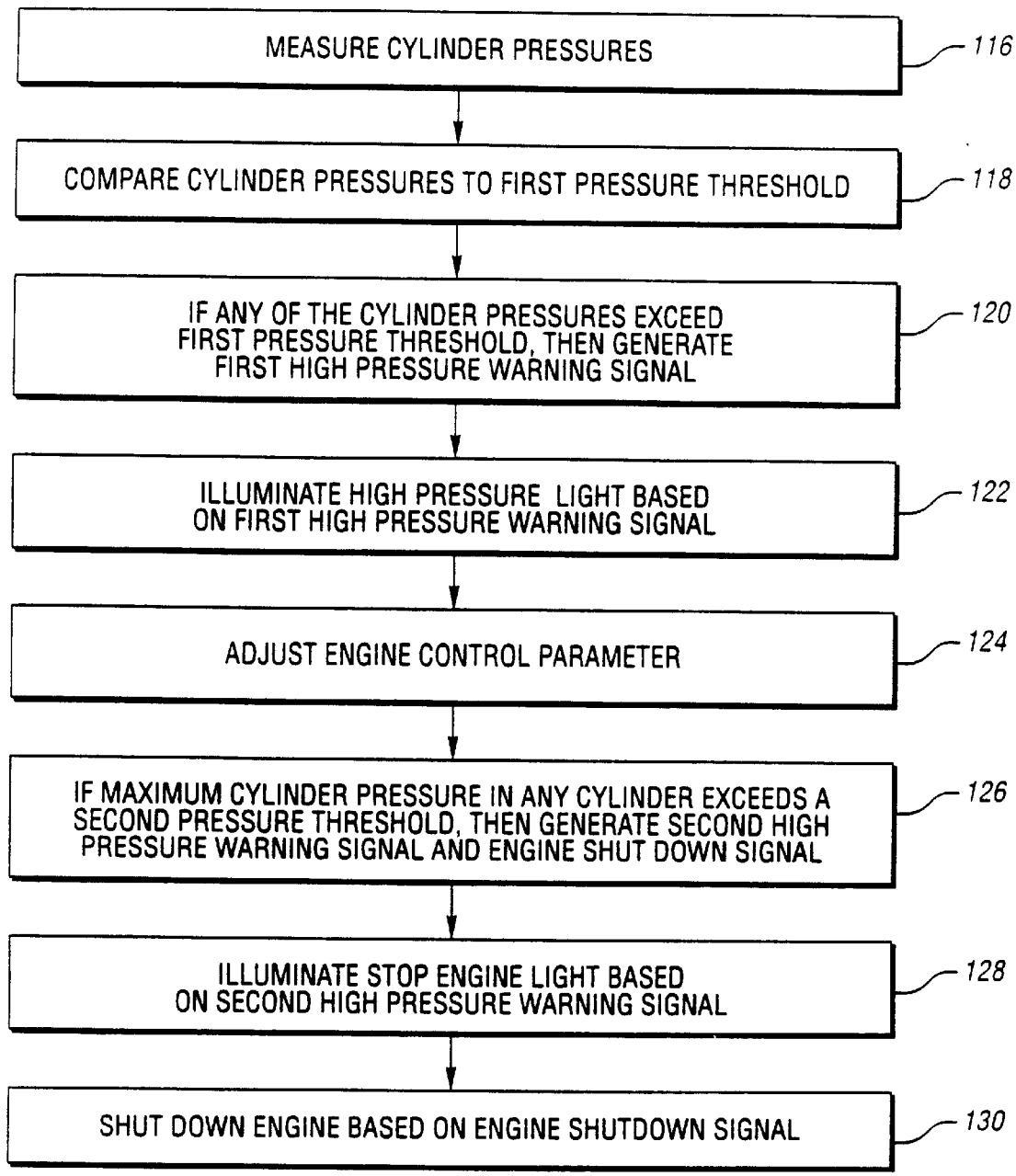
FIG. 3 is a flow chart illustrating further operation of the method for controlling the engine based on cylinder pressure.

Alternatively or supplementally, the system 10 and method of the invention may control engine operation based on cylinder pressure. Referring to FIG. 3, pressure sensors 25 are used to measure or otherwise determine cylinder pressure in the cylinders of the engine 12, as indicated at step 116. Preferably, each pressure sensor 25 measures maximum cylinder pressure of a particular cylinder during a particular cycle, such as a diesel cycle, Otto cycle, or any other suitable cycle. Next, at step 118, each cylinder pressure is compared to a first pressure threshold by the controller 30. For example, the controller 30 may be provided with one or more pressure tables that include a plurality of first pressure thresholds based on various operating conditions, such as engine speed, piston position, desired engine torque and/or fuel quantity provided to a particular cylinder. Furthermore, each first pressure threshold is preferably in the range of 0 to 1,000 pounds per square inch above a desired maximum cylinder pressure for a particular set of operating conditions.

If any of the cylinder pressures exceed the first pressure threshold for the particular operating conditions, then the controller 30 preferably generates a first high pressure warning signal at step 120. The first high pressure warning signal may be used to illuminate or otherwise activate the high pressure light 50, or other suitable indicator, as indicated at step 122. The first high pressure warning signal or other signal generated by the controller 30 may also be recorded as a code in non-volatile memory to assist maintenance personnel in diagnosing engine operating conditions. For example, the code may indicate the date, time and pertinent engine operating parameters at the time any cylinder pressure exceeded the first pressure threshold.

If any of the cylinder pressures exceed the first pressure threshold, then the controller 30, or other suitable device, also adjusts one or more engine operating or control parameters, as indicated at step 124, in an effort to reduce cylinder pressure in one or more of the cylinders. Control parameters that may be adjusted include, but are not limited to, fuel quantity provided by one or more fuel injectors 14, timing of fuel injections, air supplied to the engine 12, exhaust gas re-circulation rate, and engine loading from accessories such as an alternator (not shown) and/or an air compressor (not shown).

Because the amount of fuel provided by the fuel injectors 14 is preferably dependant on desired engine torque and/or engine speed, fuel quantities may be reduced by reducing engine torque and/or speed as a function of pressure and/or time. For example, a desired engine torque, as determined by a particular throttle position or by a variable speed governor, may be reduced by a predetermined amount based on cylinder pressure. As another example, a desired engine torque may be reduced by a predetermined amount based on the amount of time a particular cylinder pressure has exceeded the first pressure threshold. Preferably, reduced engine torque values and/or reduced engine speed values may be found in a look-up table that references cylinder pressure and/or time.

Advantageously, fuel quantities may be reduced for all cylinders or selectively reduced for only the cylinder or cylinders with cylinder pressure above the first pressure threshold. As a result, if a particular fuel injector 14 is malfunctioning and delivering more fuel to a particular cylinder than the controller 30 is calling for, then the controller 30 can reduce the fuel quantity delivered by that fuel injector 14. Thus, engine efficiency and performance can be maximized.

With respect to timing of fuel injections, such timing may be retarded, for example, so that injections commence later with respect to piston stroke and/or combustion cycle. More specifically, timing may be adjusted so that a particular fuel injection begins when a corresponding piston is at a higher point on the up-stroke of the piston. Preferably, then, the particular fuel injection will end when the corresponding piston is further passed top-dead-center. Because heat addition will end after the corresponding piston is further passed top-dead-center, cylinder pressure will be reduced. Again, the controller 30 can adjust timing of fuel injections for all cylinders, or only the cylinder or cylinders with cylinder pressure above the first pressure threshold. Furthermore, with this approach, it is possible to reduce cylinder pressure without reducing engine performance. Alternatively, timing of fuel injections may be adjusted in any suitable manner so as to reduce cylinder pressure.

Air supplied to the engine 12 may be adjusted by controlling the amount of air supplied by the air-charger system 15. For example, if the turbo-charger 16 of the air-charger system 15 is configured as a variable geometry or variable nozzle turbo-charger, the outlet orifice (not shown) of the turbo-charger compressor (not shown) may be adjusted so as to reduce the amount of compressed air provided to the air inlet manifold 13. With less compressed air being introduced into the cylinders, cylinder pressure may be reduced. Alternatively, air supplied to the engine 12 may be adjusted in any suitable manner so as to reduce cylinder pressure.

Exhaust gas re-circulation rate may be adjusted in any suitable manner so as to reduce cylinder pressure. For example, based on certain engine operating conditions, an increase in exhaust gas re-circulation rate may result in reduced cylinder pressure. Alternatively, based on other engine operating conditions, a decrease in exhaust gas re-circulation rate may result in reduced cylinder pressure.

With respect to engine loading, accessories such as the alternator (not shown) and/or air compressor (not shown) may be deactivated or slowed down so as to reduce engine loading. Because of the reduced engine loading, engine output can be reduced, which results in lower cylinder pressure.

While the step of adjusting one or more control parameters preferably commences at about the same time the high pressure light 50 or other indicator is illuminated or otherwise activated, the controller 30 or other suitable device may begin adjusting one or more control parameters prior to alerting an operator. For example, the step of adjusting one or more control parameters may begin when any of the cylinders has a cylinder pressure that exceeds a pressure threshold that is lower than the first pressure threshold.

If maximum cylinder pressure in any of the cylinders does not reduce or at least level off after one or more control parameters are adjusted, then the controller 30 preferably generates a second high pressure warning signal and an engine shut down signal if and when a second pressure threshold is exceeded by any of the cylinder pressures, as indicated at step 126. Preferably, the controller 30 is provided with one or more pressure tables that include a plurality of second pressure thresholds based on various operating conditions, such as engine speed, piston position, desired engine torque and/or fuel quantity provided to a particular cylinder. For any given set of operating conditions, however, the corresponding second pressure threshold is preferably greater than or equal to the corresponding first pressure threshold. Furthermore, each second pressure threshold for a given set of operating conditions is preferably selected so that combustion temperature will not exceed a desired maximum temperature. For example, each second pressure threshold may be in the range of 0 to 1,000 pounds per square inch above a desired maximum cylinder pressure for a particular set of operating conditions.

At step 128, the second high pressure warning signal may be used to illuminate or otherwise activate the stop engine light 52, or other suitable indicator. At step 130, the engine shut down signal is used to shut down the engine 12. For example, the engine shut down signal may be used to inhibit or shut off fuel provided by the fuel injectors 14. As another example, the engine shut down signal may be used to activate a valve in the air inlet manifold 13 so as to inhibit or shut off air flow to the engine 12. As another example, the engine shut down signal may be used to activate a fluid injection device for injecting an inert fluid such as halon into the air inlet manifold 13. As yet another example, the engine shutdown signal may be used to open exhaust valves in the cylinders so that air cannot be compressed in the cylinders.

Advantageously, cylinder pressure and combustion in each of the cylinders may be effectively controlled so as to allow the engine 12 to operate in hazardous and potentially hazardous environments. For example, if a sufficient amount of flammable gas and/or particles from the surrounding environment is entering the engine 12 through the air inlet manifold 13, all cylinders will experience elevated cylinder pressures above corresponding second pressure thresholds. In such a situation, the system 10 will operate to shut down the engine 12. Thus, the system 10 may be used to detect the presence of flammable gas and/or particles, and to shut down the engine 12 when the concentration of such gas and/or particles exceeds an acceptable level. Furthermore, by controlling cylinder pressures, the system 10 and method of the invention also effectively control operating temperatures of the engine 12.

Additionally, the system 10 and method of the invention may allow the engine 12 to continue operation if only the first pressure threshold is exceeded. For example, as previously mentioned, if a particular fuel injector 14 is over-injecting, the controller 30 can compensate by reducing fuel quantities provided by the fuel injector 14. Thus, the operator may be provided time to respond to a situation, rather than having the engine 12 abruptly shut down. Moreover, the system 10 and method of the invention provide additional protection against mechanical failures, such as cracked or broken fuel injector spray tips, that may cause higher cylinder pressures.

Figure 4:
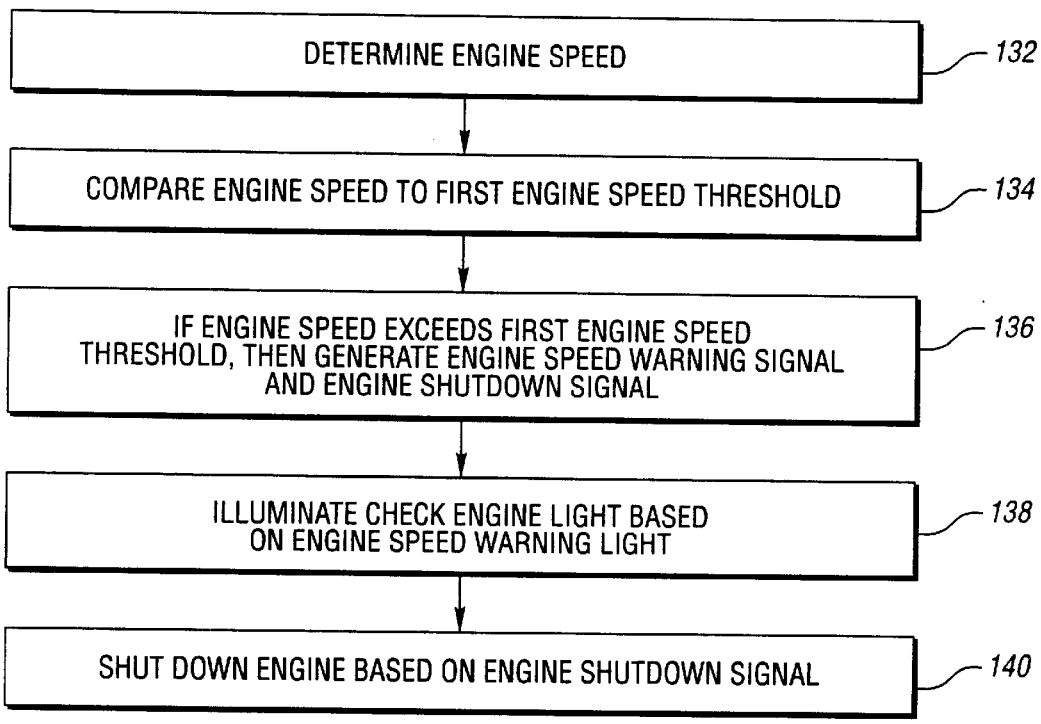
FIG. 4 is a flow chart illustrating further operation of the method for controlling the engine, wherein the method includes engine over-speed protection.

Referring to FIG. 4, the system 10 and method of the invention also preferably provide engine over-speed protection to reduce engine damage and/or to inhibit engine run away in environments containing elevated concentrations of ignitable vapors and/or particles. At step 132, engine speed is determined such as with the crankshaft sensor 24. Next, at step 134, the engine speed is compared to a high or first engine speed threshold, which is preferably in the range of 2,200 to 2,500 revolutions per minute (rpm).

If the engine speed exceeds the first engine speed threshold, then the controller 30 preferably generates an engine speed warning signal and an engine shutdown signal at step 136. At step 138, the engine speed warning signal may be used to illuminate or otherwise activate the check engine light 51 and stop engine light 52, or other suitable indicators. The engine speed warning signal may also be recorded as a code in non-volatile memory to assist maintenance personnel in diagnosing engine operating conditions. At step 140, the engine shutdown signal may be used to shut down the engine 12. For example, the engine shut down signal may be used to inhibit or completely shut off fuel delivery from the fuel injectors 14. As another example, the engine shut down signal may be used to activate a flapper valve in the air inlet manifold 13 so as to inhibit air flow to the engine 12. As another example, the engine shut down signal may be used to activate a fluid injection device for injecting an inert fluid such as halon into the air inlet manifold 13. As yet another example, the engine shutdown signal may be used to open exhaust valves in the cylinders so that air cannot be compressed in the cylinders.

Figure 5:
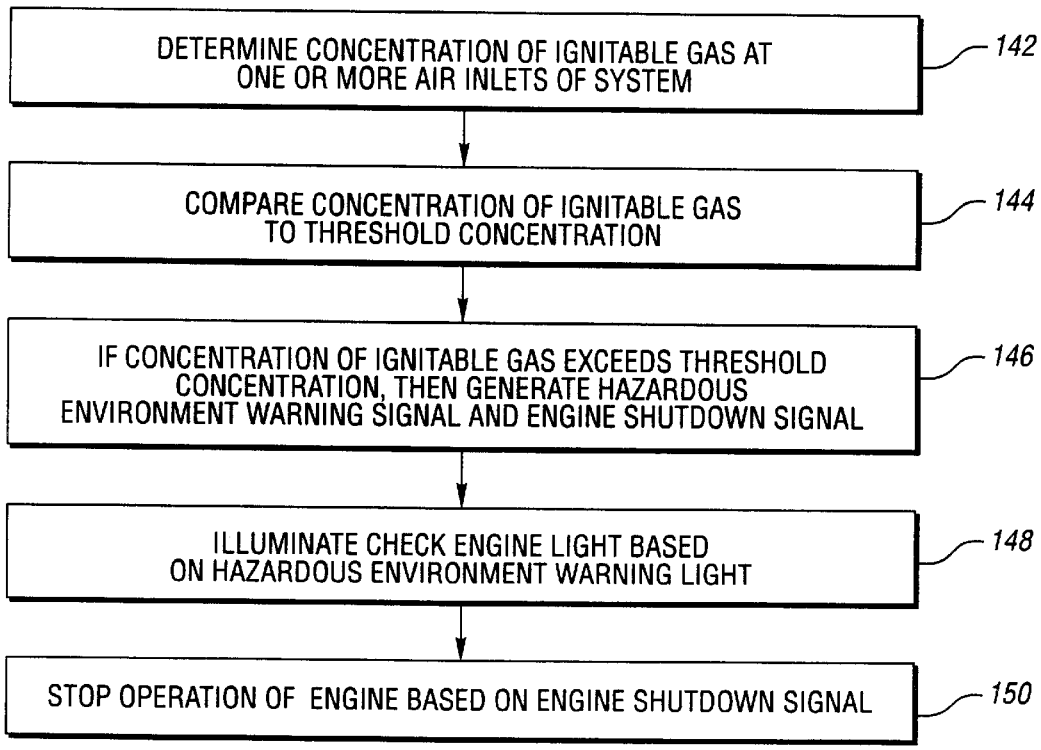
FIG. 5 is a flow chart illustrating further operation of the method for controlling the engine, wherein the method includes engine shutdown capability based on hazardous environment detection.

Referring to FIG. 5, the system 10 and method of the invention preferably provide engine shutdown capability based on hazardous environment detection. At step 142, gas/particle sensors 26 are used to measure or otherwise determine concentration of ignitable gas and/or particles at one or more air inlets of the system 10. At step 144, the concentration of ignitable gas and/or particles is compared to a threshold concentration. If the concentration of ignitable gas and/or particles exceeds the threshold concentration, then the controller 30 generates a hazardous environment warning signal and an engine shutdown signal at step 146. Next, at step 148, the hazardous environment warning signal is used to illuminate or otherwise activate the check engine light 51 and the stop engine light 52, or other suitable indicators. The hazardous environment warning signal may also be recorded as a code in non-volatile memory to assist maintenance personnel in diagnosing engine operating conditions. At step 150, the engine shutdown signal is used to stop operation of the engine 12. For example, the engine 12 may be shut down as described above with respect to engine over-speed protection.

It is to be understood that any of the engine shutdown signals described above may also be used to illuminate or otherwise activate the check engine light 51 and the stop engine light 52, or other suitable indicator. Furthermore, the engine shutdown signals described above may also be recorded as codes in non-volatile memory to assist maintenance personnel in diagnosing engine operating conditions.

The system 10 may also include one or more timers or counters for providing an averaging function and/or time lag in determining whether to generate a warning signal and/or initiate an engine control or shut down sequence. Depending upon the particular application, various types of timers/counters may be utilized. For example, an integrating timer/counter may be utilized that provides an averaging function for temperature, engine speed or vapor concentration signals. When controller 30 determines that a temperature, engine speed or vapor concentration signal has crossed a corresponding threshold, the timer/counter begins incrementing and accumulating time. When the temperature, engine speed or vapor concentration signal crosses the threshold in the opposite direction, the timer/counter begins decrementing (to a minimum value of zero). A corresponding warning signal and/or engine control or shutdown sequence is not triggered unless the timer/counter reaches some predetermined time or value. Alternatively, a count/reset timer/counter may be used that begins incrementing when a particular threshold is crossed in one direction and resets to zero when the threshold is crossed in the opposite direction. Of course, for either timer/counter, the behavior of the timer/counter depends on whether the threshold is an upper/maximum or lower/minimum threshold.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling an engine of a system, wherein the system has an air-charger system connected to the engine, and the air-charger system includes an air-charger and a charged-air cooler disposed downstream of the air-charger, the method comprising:

sensing air-charger system temperature upstream of the charged-air cooler;

comparing the air-charger system temperature to a temperature threshold;

adjusting an engine control parameter when the air-charger system temperature exceeds the temperature threshold;

comparing the air-charger system temperature to an additional temperature threshold; and shutting down the engine when the air-charger system temperature exceeds the additional temperature threshold.

2. The method of claim 1 wherein sensing air-charger system temperature includes sensing air-charger compressor outlet temperature.

3. The method of claim 1 wherein sensing air-charger system temperature includes sensing temperature of air-charger system piping.

4. The method of claim 1 wherein adjusting an engine control parameter includes reducing available engine torque.

5. The method of claim 1 wherein adjusting an engine control parameter includes reducing fuel supplied to the engine.

6. The method of claim 1 wherein adjusting an engine control parameter includes advancing timing of a fuel injection to the engine.

7. The method of claim 1 wherein adjusting an engine control parameter includes adjusting air supplied to the engine.

8. The method of claim 1 wherein adjusting an engine control parameter includes adjusting exhaust gas re-circulation rate.

9. The method of claim 1 wherein adjusting an engine control parameter includes reducing engine loading.

10. The method of claim 1 wherein the temperature threshold is less than 200 degrees Celsius.

11. The method of claim 1 wherein the temperature threshold is in the range of 160 to 190 degrees Celsius.

12. The method of claim 1 wherein the step of adjusting an engine control parameter is performed to maintain the air-charger system temperature below 200 degrees Celsius.

13. The method of claim 1 wherein the additional temperature threshold is in the range of 180 to 200 degrees Celsius.

14. The method of claim 13 wherein the temperature threshold is in the range of 160 to 190 degrees Celsius.

15. A system for controlling operation of an engine that is connected to an air-charger system having an air-charger and a charged-air cooler disposed downstream of the air-charger, the system comprising:

an air charger system temperature sensor for sensing air charger system temperature upstream of the charged-air cooler; and a controller in communication with the air charger system temperature sensor, the controller including control logic for comparing the air-charger system temperature to a temperature threshold, control logic for adjusting an engine control parameter when the air-charger system temperature exceeds the temperature threshold, control logic for comparing the air-charger system temperature to an additional temperature threshold, and control logic for generating an engine shutdown signal when the air-charger system temperature exceeds the additional temperature threshold.

16. The system of claim 15 further comprising a warning indicator in communication with the controller, the warning indicator being activated when the air-charger system temperature exceeds the temperature threshold.

17. The system of claim 15 wherein the control logic for adjusting an engine control parameter includes control logic for reducing available engine torque.

18. The system of claim 15 wherein the control logic for adjusting an engine control parameter includes control logic for reducing fuel supplied to the engine.

19. The system of claim 15 wherein the control logic for adjusting an engine control parameter includes control logic for advancing timing of a fuel injection to the engine.

20. The system of claim 15 wherein the control logic for adjusting an engine control parameter includes control logic for adjusting air supplied to the engine.

21. The system of claim 15 wherein the control logic for adjusting an engine control parameter includes control logic for adjusting exhaust gas re-circulation rate.

22. The system of claim 15 wherein the control logic for adjusting an engine control parameter includes control logic for reducing engine loading.

23. The system of claim 15 wherein the temperature threshold is in the range of 160 to 190 degrees Celsius.

24. The system of claim 15 wherein the additional temperature threshold is in the range of 180 to 200 degrees Celsius.

25. The system of claim 24 wherein the temperature threshold is in the range of 160 to 190 degrees Celsius.

26. A computer readable storage medium having information stored thereon representing instructions executable by an engine controller in communication with an air charger system temperature sensor and an engine, wherein the air-charger system temperature sensor is disposed upstream of a charged-air cooler of an air-charger system, the computer readable storage medium comprising:
   instructions for determining air charger system temperature upstream of the charged-air cooler based on signals provided by the air charger system temperature sensor;
   instructions for comparing the air charger system temperature to a temperature threshold;
   instructions for adjusting an engine control parameter when the air-charger system temperature exceeds the temperature threshold;
   instructions for comparing the air-charger system temperature to an additional temperature threshold; and
   instructions for shutting down the engine when the air-charger system temperature exceeds the additional temperature threshold.

27. The computer readable storage medium of claim 26 wherein instructions for adjusting an engine control parameter include instructions for reducing available engine torque.

28. The computer readable storage medium of claim 26 wherein instructions for adjusting an engine control parameter include instructions for reducing fuel supplied to the engine.

29. The computer readable storage medium of claim 26 wherein instructions for adjusting an engine control parameter include instructions for advancing timing of a fuel injection to the engine.

30. The computer readable storage medium of claim 26 wherein instructions for adjusting an engine control parameter include instructions for adjusting air supplied to the engine.

31. The computer readable storage medium of claim 26 wherein instructions for adjusting an engine control parameter include instructions for adjusting exhaust gas re-circulation rate.

32. The computer readable storage medium of claim 26 wherein instructions for adjusting an engine control parameter include instructions for reducing engine loading.

33. The computer readable storage medium of claim 26 wherein the temperature threshold is in the range of 160 to 190 degrees Celsius.

34. The computer readable storage medium of claim 26 wherein the additional temperature threshold is in the range of 180 to 200 degrees Celsius.

35. The computer readable storage medium of claim 34 wherein the temperature threshold is in the range of 160 to 190 degrees Celsius.

36. A method for controlling an engine of a system such that the system is useable in a hazardous environment, wherein the system includes an air-charger subsystem connected to the engine, and the air-charger subsystem includes an air-charger and a charged-air cooler disposed downstream of the air-charger, the method comprising:
   sensing air-charger subsystem temperature upstream of the charged-air cooler;
   comparing the air-charger subsystem temperature to a first temperature threshold that is in the range of 160 to 190 degrees Celsius;
   adjusting an engine control parameter when the air-charger subsystem temperature exceeds the first temperature threshold to maintain the air-charger subsystem temperature below 200 degrees Celsius;
   comparing the air-charger subsystem temperature to a second temperature threshold that is in the range of 180 to 200 degrees Celsius; and
   shutting down the engine when the air-charger subsystem temperature exceeds the second temperature threshold.

37. The method of claim 36 wherein sensing air-charger subsystem temperature includes sensing air-charger compressor outlet temperature.

38. The method of claim 36 wherein sensing air-charger subsystem temperature includes sensing temperature of air-charger subsystem piping.

39. The method of claim 36 wherein adjusting an engine control parameter includes reducing available engine torque.

40. The method of claim 36 wherein adjusting an engine control parameter includes reducing fuel supplied to the engine.

41. The method of claim 36 wherein adjusting an engine control parameter includes advancing timing of a fuel injection to the engine to reduce air-charger subsystem temperature without reducing engine performance.

42. The method of claim 36 wherein adjusting an engine control parameter includes reducing amount of compressed air supplied to the engine by the air-charger subsystem.

43. The method of claim 36 wherein adjusting an engine control parameter includes adjusting exhaust gas re-circulation rate.

44. The method of claim 36 wherein adjusting an engine control parameter includes reducing engine loading.

45. A method for controlling an engine of a system, wherein the system has an air-charger system connected to the engine, and the air-charger system includes an air-charger and a charged-air cooler disposed downstream of the air-charger, the method comprising:

sensing air-charger system temperature upstream of the charged-air cooler;

comparing the air-charger system temperature to a temperature threshold; and reducing available engine torque when the air-charger system temperature exceeds the temperature threshold.

46. A method for controlling an engine of a system, wherein the system has an air-charger system connected to the engine, and the air-charger system includes an air-charger and a charged-air cooler disposed downstream of the air-charger, the method comprising:

sensing air-charger system temperature upstream of the charged-air cooler;

comparing the air-charger system temperature to a temperature threshold; and reducing fuel supplied to the engine when the air-charger system temperature exceeds the temperature threshold.

47. A method for controlling an engine of a system, wherein the system has an air-charger system connected to the engine, and the air-charger system includes an air-charger and a charged-air cooler disposed downstream of the air-charger, the method comprising:

sensing air-charger system temperature upstream of the charged-air cooler;

comparing the air-charger system temperature to a temperature threshold; and advancing timing of a fuel injection to the engine when the air-charger system temperature exceeds the temperature threshold.

48. A method for controlling an engine of a system, wherein the system has an air-charger system connected to the engine, and the air-charger system includes an air-charger and a charged-air cooler disposed downstream of the air-charger, the method comprising:

sensing air-charger system temperature upstream of the charged-air cooler;

comparing the air-charger system temperature to a temperature threshold; and adjusting air supplied to the engine when the air-charger system temperature exceeds the temperature threshold.

49. A method for controlling an engine of a system, wherein the system has an air-charger system connected to the engine, and the air-charger system includes an air-charger and a charged-air cooler disposed downstream of the air-charger, the method comprising:

sensing air-charger system temperature upstream of the charged-air cooler;

comparing the air-charger system temperature to a temperature threshold; and adjusting exhaust gas re-circulation rate when the air-charger system temperature exceeds the temperature threshold.

50. A method for controlling an engine of a system, wherein the system has an air-charger system connected to the engine, and the air-charger system includes an air-charger and a charged-air cooler disposed downstream of the air-charger, the method comprising:

sensing air-charger system temperature upstream of the charged-air cooler;

comparing the air-charger system temperature to a temperature threshold; and reducing engine loading when the air-charger system temperature exceeds the temperature threshold.

51. A method for controlling an engine of a system, wherein the system has an air-charger system connected to the engine, and the air-charger system includes an air-charger and a charged-air cooler disposed downstream of the air-charger, the method comprising:

sensing air-charger system temperature upstream of the charged-air cooler;

comparing the air-charger system temperature to a temperature threshold that is in the range of 160 to 190 degrees Celsius; and adjusting an engine control parameter when the air-charger system temperature exceeds the temperature threshold.

52. A system for controlling operation of an engine that is connected to an air-charger system having an air-charger and a charged-air cooler disposed downstream of the air-charger, the system comprising:

an air charger system temperature sensor for sensing air charger system temperature upstream of the charged-air cooler;

a controller in communication with the air charger system temperature sensor, the controller including control logic for comparing the air-charger system temperature to a temperature threshold, and control logic for adjusting an engine control parameter when the air-charger system temperature exceeds the temperature threshold; and a warning indicator in communication with the controller, the warning indicator being activated when the air-charger system temperature exceeds the temperature threshold.

53. A system for controlling operation of an engine that is connected to an air-charger system having an air-charger and a charged-air cooler disposed downstream of the air-charger, the system comprising:

an air charger system temperature sensor for sensing air charger system temperature upstream of the charged-air cooler; and a controller in communication with the air charger system temperature sensor, the controller including control logic for comparing the air-charger system temperature to a temperature threshold, and control logic for reducing available engine torque when the air-charger system temperature exceeds the temperature threshold.

54. A system for controlling operation of an engine that is connected to an air-charger system having an air-charger and a charged-air cooler disposed downstream of the air-charger, the system comprising:

an air charger system temperature sensor for sensing air charger system temperature upstream of the charged-air cooler; and a controller in communication with the air charger system temperature sensor, the controller including control logic for comparing the air-charger system temperature to a temperature threshold, and control logic for reducing fuel supplied to the engine when the air-charger system temperature exceeds the temperature threshold.

55. A system for controlling operation of an engine that is connected to an air-charger system having an air-charger and a charged-air cooler disposed downstream of the air-charger, the system comprising:

an air charger system temperature sensor for sensing air charger system temperature upstream of the charged-air cooler; and a controller in communication with the air charger system temperature sensor, the controller including control logic for comparing the air-charger system temperature to a temperature threshold, and control logic for advancing timing of a fuel injection to the engine when the air-charger system temperature exceeds the temperature threshold.

56. A system for controlling operation of an engine that is connected to an air-charger system having an air-charger and a charged-air cooler disposed downstream of the air-charger, the system comprising:

an air charger system temperature sensor for sensing air charger system temperature upstream of the charged-air cooler; and a controller in communication with the air charger system temperature sensor, the controller including control logic for comparing the air-charger system temperature to a temperature threshold, and control logic for adjusting air supplied to the engine when the air-charger system temperature exceeds the temperature threshold.

57. A system for controlling operation of an engine that is connected to an air-charger system having an air-charger and a charged-air cooler disposed downstream of the air-charger, the system comprising:

an air charger system temperature sensor for sensing air charger system temperature upstream of the charged-air cooler; and a controller in communication with the air charger system temperature sensor, the controller including control logic for comparing the air-charger system temperature to a temperature threshold, and control logic for adjusting exhaust gas re-circulation rate when the air-charger system temperature exceeds the temperature threshold.

58. A system for controlling operation of an engine that is connected to an air-charger system having an air-charger and a charged-air cooler disposed downstream of the air-charger, the system comprising:

an air charger system temperature sensor for sensing air charger system temperature upstream of the charged-air cooler; and a controller in communication with the air charger system temperature sensor, the controller including control logic for comparing the air-charger system temperature to a temperature threshold, and control logic for reducing engine loading when the air-charger system temperature exceeds the temperature threshold.

59. A system for controlling operation of an engine that is connected to an air-charger system having an air-charger and a charged-air cooler disposed downstream of the air-charger, the system comprising:

an air charger system temperature sensor for sensing air charger system temperature upstream of the charged-air cooler; and a controller in communication with the air charger system temperature sensor, the controller including control logic for comparing the air-charger system temperature to a temperature threshold that is in the range of 160 to 190 degrees Celsius, and control logic for adjusting an engine control parameter when the air-charger system temperature exceeds the temperature threshold.

* * * * *